Figure 1:
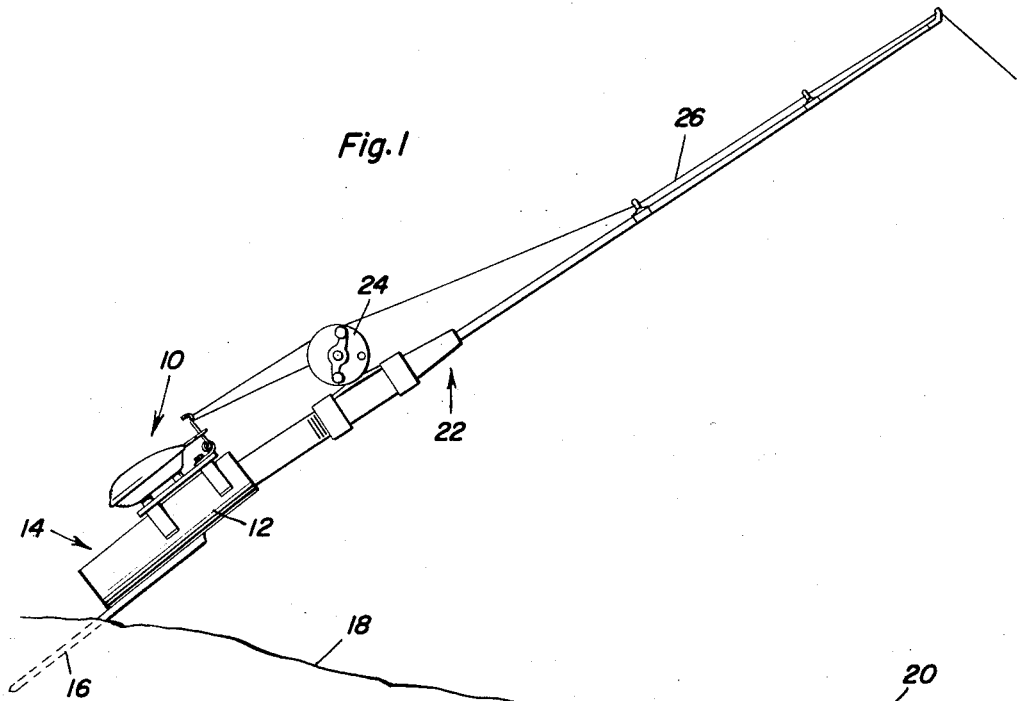

Aug. 9, 1960  F. A. PATRICELLO  2,948,076
FISH STRIKE SIGNAL
Filed March 27, 1958

Fred A. Patricello
INVENTOR.

BY *Clarence A. O'Brien*
*and Harvey B. Jacobson*
Attorneys

United States Patent Office 2,948,076
Patented Aug. 9, 1960

2,948,076

FISH STRIKE SIGNAL

Fred A. Patricello, 495 Mundy Lane, Mount Vernon, N.Y.

Filed Mar. 27, 1958, Ser. No. 724,325

1 Claim. (Cl. 43—17)

This invention relates generally to signal device and more particularly to a signal device particularly designed to detect and indicate the presence of a fish on a line.

Often, surf fishermen stake a plurality of fishing rods into the ground and leave them substantially individually unattended. In order to continually check the individual fishing lines to see if any fish is on the line, a fisherman must expend considerable energy in traversing the shore line. Further, because continual checking is necessary, a definite maximum number of lines may be watched by one fisherman. It, of course, would be extremely convenient if an audible or visual alarm could be actuated when a fish is on the line. Therefore, it is the principal object of this invention to provide a fish strike signal which indicates to the surf fisherman that a strike has been made.

Further, it would be convenient if rather than using audible means, which tend to scare fish away, visual means could be utilized at night which would clearly signal the fisherman. Therefore, it is a further object of this invention to provide a fish strike signal which incorporates both audible and visual signalling means.

It is still a further object of this invention to provide fish strike signalling means which may be conveniently placed on and removed from the stake holding the fishing rod.

It is a still further object of this invention to provide a fish strike signal which is relatively inexpensive to manufacture, inexpensive to maintain, and particularly lends itself to ease of repair.

In accordance with the above stated objects, below is particularly described a fish strike signal to be used in combination with a stake having an upper tubular portion for holding a fishing rod. The signal includes an insulative housing supported by a conductive bracket with resilient means on the bracket for mounting the bracket and housing on the tubular portion of the stake. The housing carries a source of electrical energy and audible and visual electrically energizable signal means. A conductive ring extends externally of the housing and is connected to one side of the energy source carried within the housing. A flexible hook extends from the bracket through the ring and is adapted to confine the fishline thereon whereby a pull on the fish line will cause the hook to bend so as to contact the conductive ring for completing an electrical circuit through the energy source and signal means.

Figure 2:
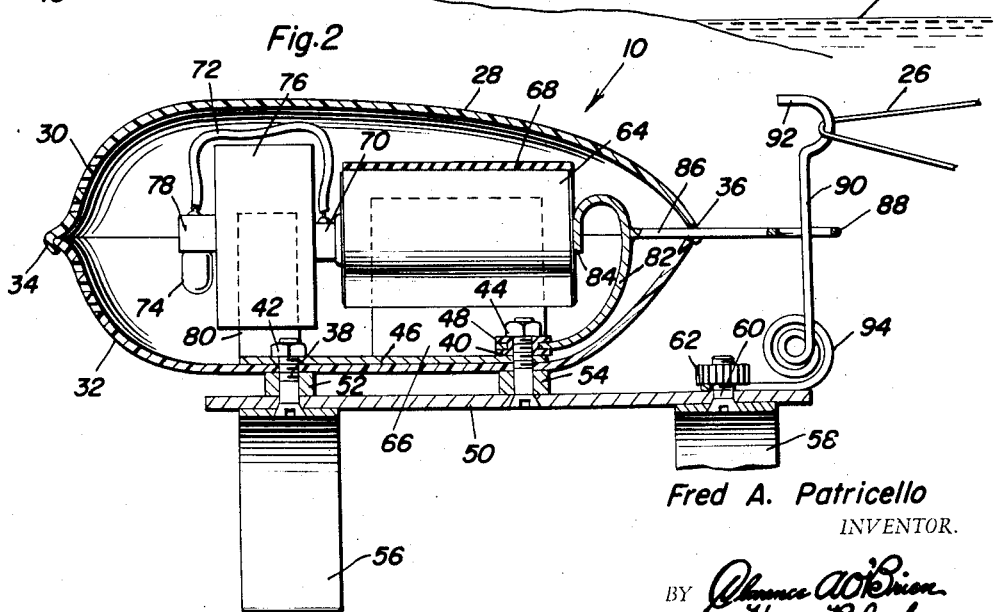

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is an elevational side view indicating how the signal comprising this invention is utilized in combination with a fishing rod stake; and Figure 2 is a sectional view illustrating the inner detail of the signal.

With continuing reference to the drawings and initial reference to Figure 1, the numeral 10 generally represents the fish strike signal comprising this invention and adapted to be utilized on a tubular portion 12 of stake 14 having an elongated and pointed portion 16 adapted to be inserted in the ground 18 proximate the shore line and inclined toward the water 20.

The tubular portion 12 of the stake 14 is adapted to receive a conventional fishing rod 22 having a reel 24 and a fishing line 26.

More particularly referring to Figure 2, the numeral 28 designates the insulative signal housing having an upper portion 30 and a lower portion 32. The upper portion 30 has a circumferential projection 34 which is adapted to accommodate the upper surface of the lower portion 32 to substantially fix the upper and lower portions relative to each other. The housing 28 may be constructed of a plastic or a hard rubber. An aperture 36 is formed at the rear of the housing 28 along the junction line of the upper portion 30 and lower portion 32.

The insulative housing 28 has a pair of apertures which pass screws 38 and 40 and are held by nuts 42 and 44. Carried between the nuts 42 and 44 and the housing 28 is an electrically conductive plate 46. Further carried on the screw 40 between the nut 44 and the conductive plate 46 is an insulative grommet 48. The screws 38 and 40 support the housing 28 on an electrically conductive bracket 50. A pair of washers 52 and 54 space the housing 28 from the bracket 50. Further, a pair of U-shaped resilient clamps 56 and 58 depend from the bracket 50. The U-shaped clamp 56 has an aperture which passes the screw 38 so as to maintain the clamp 56 fixed to the bracket 50. The U-shaped clamp 58 passes a screw 60 which is held by a nut 62.

Carried within the housing 28 is an electrical energy source 64 which may be a dry cell battery. The battery 64 may be supported by a conductive clamp 66 which may be electrically connected to the plate 46. An insulative coating 68 surrounds the battery 64 so that the member 66 is not effectively electrically connected to the battery 64. A first terminal of the battery 70 is electrically connected to a wire 72 which feeds one terminal of a bulb 74. Further, the battery terminal 70 is electrically connected to a horn 76. The horn 76 and bulb 74 are electrically returned through the collar 78 and electrical clamp 80 to the conductive plate 46. The insulative grommet 48 supports an arcuate conductive element 82 which contacts a second battery terminal at 84. The contact at 84 is a permanent soldered connection. The arcuate conductive element 82 has a perpendicular extension 86 which terminates in a conductive ring portion 88.

The electrically conductive plate 46 is of course electrically connected through the screw 38 to the conductive bracket 50. A flexible hook member 90 having a top hook 92 and a bottom coil spring 94 is electrically affixed to the bracket 50 by the nut 62 and screw 60. The hook 92 is adapted to confine a portion of the fishing rod 26 as is illustrated in both Figures 1 and 2.

In the operation of this invention, under normal circumstances, when there is no fish on the line, the hook member 90 extends through the conductive ring 88 but, however, is not in electrical contact therewith. Therefore, though the battery terminal 70 is electrically connected to one side of the horn 76 and bulb 74, these signal elements are not electrically returned to a second side of the battery. However, when a fish is on the line 26, the fish will tend to jerk or pull the line and the hook 90 will flex about the coil spring portion 94 so as to come in contact with the conductive ring 88. A complete electrical energized circuit will then extend through the signal devices 74 and 76 to indicate to the fisherman that a fish is on the line. The complete circuit may be followed from the battery terminal 70 to one side of the alarm devices 74 and 76 and thence through collar 78 and clamp 80 through plate 46 and screw 38 to bracket 50. From the bracket 50, the circuit continues through hook member 90 which would be flexed to contact conductive ring 88 which extends through projection 86 to the arcuate conductive element 82 and thence to the second battery terminal as at 84.

It is stressed of course that modifications of this particular structure are within the contemplation of the invention. More particularly, of course, different type signal devices may be utilized and means may be included for selectively energizing the devices for, for instance, to utilize the bulb 74 at night and the audible horn 76 during the day. In summary, it is particularly to be noted that the resilient clamping means allow for an efficient retention of the signal on the tubular stick portion.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A fish strike signal comprising an insulative housing supported by a conductive bracket, resilient means for mounting said bracket on a stake, a source of electrical energy carried within said housing, signal means carried within said housing and electrically connected between said source and said bracket, actuating means carried between said bracket and said housing for completing an electrical circuit between said source and said signal, said actuating means including a conductive ring extending externally of said housing electrically connected to said energy source, a conductive flexible hook terminally and electrically retained by said bracket and extending through said ring, said hook adapted to confine a fishing line whereby a pull on said line will force said hook into contact with said ring for completing an electrical circuit to said signal.

References Cited in the file of this patent
UNITED STATES PATENTS

| | | |
|---|---|---|
| 2,354,279 | Ross | July 25, 1944 |
| 2,446,427 | Linder | Aug. 3, 1948 |
| 2,530,050 | Evans | Nov. 14, 1950 |
| 2,580,956 | Reddick | Jan. 1, 1952 |
| 2,645,050 | Golias | July 14, 1953 |
| 2,771,703 | Jones | Nov. 27, 1956 |
| 2,772,407 | Nichols | Nov. 27, 1956 |